United States Patent
Altaf et al.

(10) Patent No.: US 12,552,553 B2
(45) Date of Patent: Feb. 17, 2026

(54) CROWDSOURCE SATELLITE NETWORK

(71) Applicant: INTERNATIONAL BUSINESS MACHINES CORPORATION, Armonk, NY (US)

(72) Inventors: Naeem Altaf, Round Rock, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 18/497,091

(22) Filed: Oct. 30, 2023

(65) Prior Publication Data

US 2025/0136300 A1    May 1, 2025

(51) Int. Cl.
*B64G 1/24* (2006.01)
*B64G 1/68* (2006.01)

(52) U.S. Cl.
CPC .............. *B64G 1/242* (2013.01); *B64G 1/244* (2019.05); *B64G 1/68* (2013.01)

(58) Field of Classification Search
CPC .......... B64G 1/242; B64G 1/244; B64G 1/68; B64G 1/1085; B64G 1/66; B64G 3/00
See application file for complete search history.

(56) References Cited

U.S. PATENT DOCUMENTS

| | | |
|---|---|---|
| 8,052,092 B2 | 11/2011 | Atmur |
| 8,833,702 B2 | 9/2014 | Briskman |
| 10,543,939 B2 | 1/2020 | Kaplan |
| 11,570,375 B2 | 1/2023 | Zhang |
| 11,608,195 B1 | 3/2023 | Dombrowski |
| 11,649,076 B2 | 5/2023 | Jonsimon |
| 2013/0124079 A1* | 5/2013 | Olivier ............... B64G 3/00 701/301 |
| 2013/0292517 A1* | 11/2013 | Briskman ............ B64G 1/2429 244/158.8 |
| 2014/0052293 A1* | 2/2014 | Bruemmer .......... G05D 1/0088 700/255 |
| 2016/0379388 A1* | 12/2016 | Rasco .................. G06Q 10/04 715/753 |

(Continued)

OTHER PUBLICATIONS

"10 Things: What's That Space Rock?," https://science.nasa.gov/solar-system/10-things-whats-that-space-rock, Jul. 21, 2022, 17 pages.

(Continued)

*Primary Examiner* — Donald J Wallace
*Assistant Examiner* — Jalal C Coduroglu
(74) *Attorney, Agent, or Firm* — Eric W. Chesley (57) ABSTRACT

Described are techniques for determining an impact threat of an orbiting object by a crowdsource satellite network. The techniques include capturing, by a satellite included in a crowdsource satellite network, information associated with an orbiting object detected by the satellite. The techniques further include providing, by the satellite, the information associated with the orbiting object to the crowdsource satellite network. The techniques further include collaborating by the satellite with other satellites in the crowdsource satellite network to track the orbiting object, generate an orbital model of the orbiting object, and to analyze a predicted path of the orbiting object represented by the orbital model to determine an impact threat associated with the predicted path of the orbiting object.

20 Claims, 6 Drawing Sheets

(56) References Cited

U.S. PATENT DOCUMENTS

| | | | |
|---|---|---|---|
| 2017/0096242 A1* | 4/2017 | Alfano | B64G 1/244 |
| 2018/0346153 A1 | 12/2018 | Kaplan | |
| 2021/0011148 A1 | 1/2021 | Blondel | |
| 2021/0405187 A1* | 12/2021 | Rosner | G01S 13/933 |
| 2022/0017239 A1 | 1/2022 | Chen | |
| 2022/0018972 A1* | 1/2022 | Bennington | G05D 1/101 |
| 2022/0081132 A1* | 3/2022 | Mukae | B64G 3/00 |
| 2022/0117239 A1 | 4/2022 | Sidhu et al. | |
| 2022/0245833 A1 | 8/2022 | Curti | |
| 2022/0371755 A1* | 11/2022 | Mukae | B64G 1/52 |
| 2023/0068550 A1 | 3/2023 | Rojas | |
| 2023/0143237 A1 | 5/2023 | Mukae | |
| 2024/0140618 A1* | 5/2024 | Mukae | B64G 1/1028 |
| 2024/0182184 A1* | 6/2024 | Rakshit | B64G 3/00 |
| 2024/0400231 A1* | 12/2024 | Koblick | B64G 3/00 |

OTHER PUBLICATIONS

Dennis, Andrew, "Ground Based Optical Detector for Space Debris Tracking," Andor Oxford Instruments, Nov. 2018, 3 pages.

Li et al., "A Machine Learning-Based Approach for Improved Orbit Predictions of LEO Space Debris With Sparse Tracking Data From a Single Station," Queensland University of Technology, 2020, 16 pages.

Merholz et al. "Detecting, Tracking and Imaging Space Debris," eesa bulletin 109, Feb. 2002, pp. 128-134.

Polli et al., "Analytical Model For Collision Probability Assessment With Large Satellite Constellations," arXiv:2205.15774v1 [astro-ph.IM] May 31, 2022, 17 pages.

Raigoza et al., "Autonomous Trajectory Generation Comparison for De-Orbiting With Multiple Collision Avoidance," Sensors, Sep. 19, 2022, 17 pages.

Ren at al., "The Interaction Between the LEO Satellite Constellation and the Space Debris Environment," Applied Sciences, Oct. 13, 2021, 17 pages.

Suchodolski, Tomasz, "Active Control Loop of the Borrowiec SLR Space Debris Tracking System," Sensors, Mar. 14, 2022, 16 pages.

Wall, Mike, "Space collision: Chinese satellite got whacked by hunk of Russian rocket in March," Space. com, Aug. 17, 2021, 13 pages.

Zhang et al., "Space Object Detection in Video Satellite Images Using Motion Information," Hindawi International Journal of Aerospace Engineering, Oct. 17, 2017, 10 pages, vol. 2017, Article ID 1024529.

Denby, et al., Orbital Edge Computing: Nanosatellite Constellations as a New Class of Computer System, ASPLOS '20: Architectural Support for Programming Languages and Operating Systems, Mar. 2020, pp. 939-954.

Kim, et al., Satellite Edge Computing Architecture and Network Slice Scheduling for IoT Support, in IEEE Internet of Things Journal, Aug. 15, 2022, vol. 9, No. 16, pp. 14938-14951.

Live Space Station Tracking Map, Retrieved from: https://web.archive.org/web/20181121224900/https://spotthestation.nasa.gov/tracking_map.cfm, Nov. 21, 2018, 2 pages.

Satellite Edge Computing, Retrieved from: https://web.archive.org/web/20220529113622/https://www.nearbycomputing.com/solutions/satellite-edge/, May 29, 2022, 8 pages.

Spectator, Retrieved from: https://web.archive.org/web/20180817073552/https://spectator.earth/, Aug. 17, 2018, 3 pages.

Wainscott-Sargent, A., Enabling the Edge: Cloud Capabilities Push Satellite Forward, Retrieved from: https://interactive.satellitetoday.com/via/november-2021/enabling-the-edge-cloud-capabilities-push-satellite-forward, Oct. 20, 2021, 8 pages.

* cited by examiner

CROWDSOURCE SATELLITE NETWORK

BACKGROUND

The present disclosure relates to satellite networks, and, more specifically, to tracking orbiting objects using a satellite network.

An artificial satellite is an object intentionally placed into orbit around an astronomical object, such as the Earth, a planet, or a moon. Orbital debris can include natural meteoroids and defunct human-made objects that orbit an astronomical object, such as nonfunctional spacecraft, abandoned launch vehicle stages, mission-related debris, and fragmentation debris from the breakup of derelict rocket bodies and spacecraft. Orbital debris travels in a circular or near-circular orbit around an astronomical object where the orbital debris may threaten an artificial satellite that is in a path of the orbital debris.

SUMMARY

Aspects of the present disclosure are directed toward a computer-implemented method for determining impact threats of orbiting objects. The computer-implemented method comprises capturing, by a satellite included in a crowdsource satellite network, information associated with an orbiting object detected by the satellite. The computer-implemented method further comprises providing, by the satellite, the information associated with the orbiting object to the crowdsource satellite network. The computer-implemented method further comprises collaborating by the satellite with other satellites in the crowdsource satellite network to track the orbiting object, generate an orbital model of the orbiting object, and to analyze a predicted path of the orbiting object represented by the orbital model to determine an impact threat associated with the predicted path of the orbiting object.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward a crowdsource satellite network that detects and tracks orbiting objects, and determines impact threats of the orbiting objects. While not limited to such applications, embodiments of the present disclosure may be better understood in light of the aforementioned context.

The increasing number of satellites being launched into space each year, along with the increase of orbital debris being abandoned in space, makes the possibility of a satellite-orbital debris collision more and more likely. Already there have been many near-collisions between satellites and orbital debris, and as more satellites are put into orbit, the chances that a collision will happen increase. It is theorized that a sufficiently large satellite-orbital debris collision could potentially lead to a cascade effect, which could make some low Earth orbits (LEOs) effectively unusable for long term use by satellites. Therefore, it is increasingly important to monitor orbiting objects in space to avoid a satellite-orbital debris collision. However, with the increasing usage of LEO for satellite related operations, tracking orbiting objects to avoid collisions has become a very difficult task.

Advantageously, aspects of the present disclosure can overcome these challenges by using a crowdsource satellite network to detect and track orbiting objects (e.g., orbital debris or artificial satellite) and determine impact threats of the orbiting objects to satellites and/or other spacecraft. A crowdsource satellite network comprises a number of satellites (e.g., tens, hundreds, thousands) that, among other things, monitor an area of space (e.g., LEO, as well as medium Earth orbit and/or high Earth orbit) proximate to the satellites to detect orbiting objects and capture information (e.g., position and direction of an object, type of object, size of object, weight of object, etc.) associated with the orbiting objects. The satellites provide the information to the crowdsource satellite network to allow the satellites to collaborate via distributed computing to track the orbiting objects and generate orbital models of the orbiting objects. The crowdsource satellite network analyzes the predicted paths of the orbiting objects modeled by the orbital models to determine impact threats of the orbiting objects to satellites and other spacecraft. In the event that an impact threat of an orbiting object indicates that an impact with a target satellite-spacecraft is likely, aspects of the present disclosure can change the orbital path of the target satellite-spacecraft to avoid the orbiting object, and/or provide the predicted path of the orbiting object to a debris collection satellite to allow the debris collection satellite to intercept (remove) the orbiting object.

Figure 1:
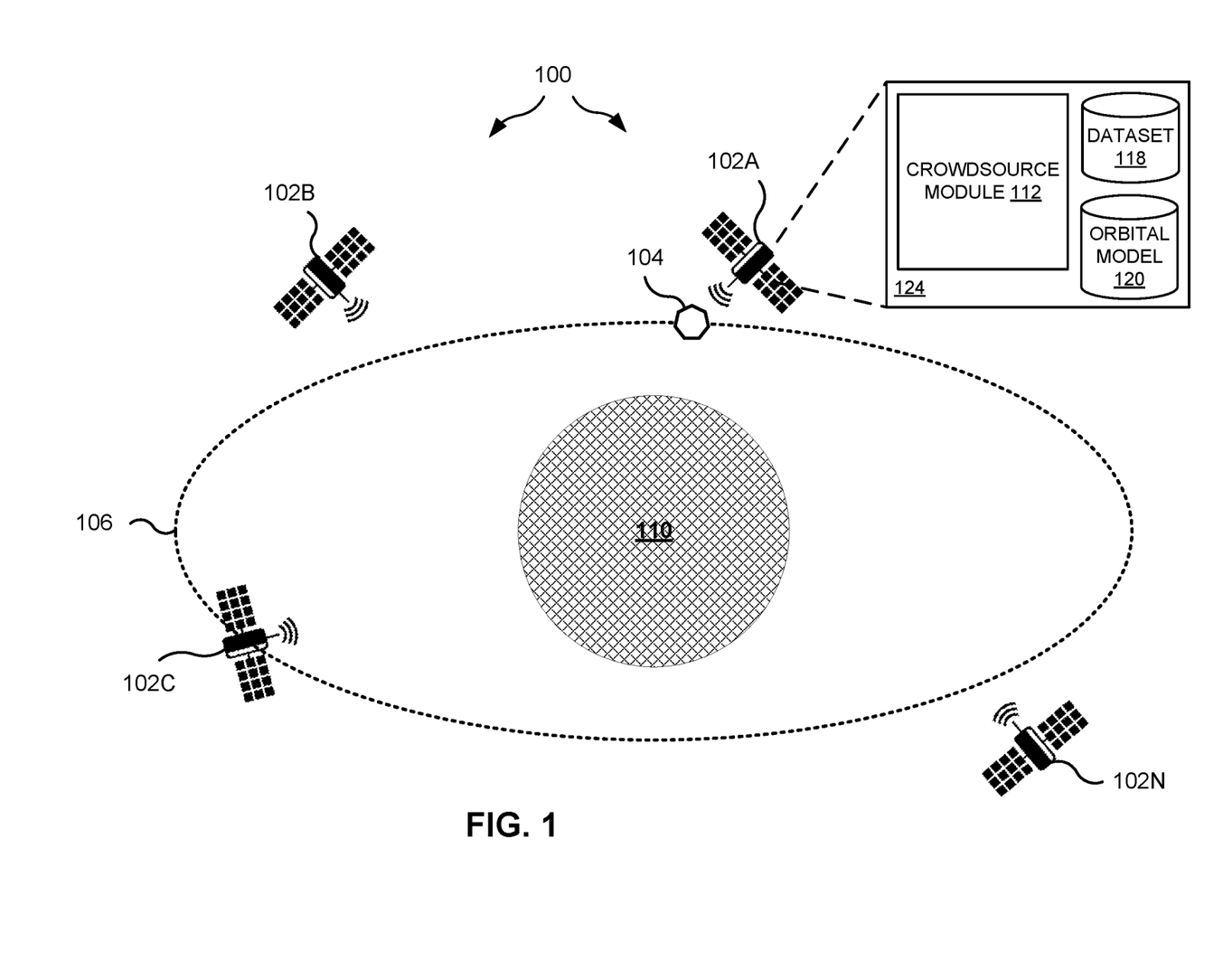
FIG. 1 is a diagram illustrating components of an example crowdsource satellite network, in accordance with some embodiments of the present disclosure.

Referring now to the figures, FIG. 1 is a diagram illustrating components of an example crowdsource satellite network 100, in accordance with some embodiments of the present disclosure. The crowdsource satellite network 100 includes a number of satellites 102A, 102B, 102C, 102N (collectively 102, where N can represent any positive integer of any number of satellites) that are in orbit around an astronomical object 110 and perform edge/distributed computing to determine an impact threat associated with an orbiting object 104. The satellites 102 comprise multi-function vehicles with onboard computing 124 (e.g., processors, memory devices, storage devices, etc.) that supplements existing sensing, communication, and control hardware. For example, a satellite's onboard computing 124 can comprise a computer 601 as illustratively shown in FIG. 6. A satellites' onboard computing 124 can be configured for edge computing, which is a distributed computing paradigm that brings computation and data storage resources closer to the sources of data (e.g., sensor data generated by a satellite's sensors for detecting orbiting objects 104). Edge computing is a topology and location sensitive form of distributed computing. Hosting computing resources in an edge computing environment (crowdsource satellite network 100) improves response times and saves network bandwidth.

Depending on various factors, such as size and distance of an orbiting object 104, the crowdsource satellite network 100 detects and identifies the orbiting object 104, and determines an impact threat associated with the orbiting object 104. The satellites 102 in the crowdsource satellite network 100 collaborate to detect and track orbiting objects 104, as well as, in some examples, perform other functions, such as communication relay, weather forecasting, navigation, broadcasting, scientific research, observation, debris removal, etc. The satellites 102 are equipped with one or more sensors (not shown) for detecting orbiting objects 104 that come within a detection proximity of the sensors. In some examples, an array of sensors that provide different fields of view and orientations to detect orbiting objects 104 of various sizes at various altitudes and distances can be used. In some embodiments, the sensors can comprise visual and/or thermal cameras. As one example, a scientific complementary metal-oxide semiconductor (sCMOS) camera can be used for optical detection of orbiting objects 104. The high quantum efficiency.

(QE) and low noise properties of sCMOS technology render it highly sensitive, and the multiplexed readout architecture of sCMOS provides for a large field of view for detecting orbiting objects 104. As other examples, a satellite 102 can be equipped with a radar sensor(s), a light detection and ranging (LiDAR) sensor(s), an optical spectrometer(s), and/or other sensors for capturing information related to an orbiting object 104. Sensor data generated by the sensors can be stored in a satellite's onboard data storage for processing.

As illustrated in FIG. 1, the satellites 102 host a crowdsource module 112, as well as other modules as will be appreciated. The crowdsource module 112 enables the satellites 102 in the crowdsource satellite network 100 to collaborate with each other via edge/distributed computing to perform functions that include, but are not limited to: identifying and tracking orbiting objects 104, generating orbital models 120 for the orbiting objects 104, classifying impact threats of the orbiting objects 104, identifying a proactive action to perform (e.g., change orbital path, remove debris, etc.), as well as other functions.

More specifically, the crowdsource module 112 identifies an orbiting object 104 captured in sensor data (e.g., images) generated by a satellite's sensor(s) and extracts information associated with the orbiting object 104 from the sensor data. In some embodiments, the crowdsource module 112 analyzes sensor data using an object detection technique to identify an orbiting object 104 captured in the sensor data. As a non-limiting example, the object detection technique analyzes the sensor data (e.g., video images) using motion information to determine an effect of the satellite's attitude motion on an image quantitatively, which can be decomposed into translation and rotation. Considering the continuity of object motion and brightness change, variable thresholding based on local image properties and detection in a previous frame can be used to segment a single-frame image. Thereafter, the object detection technique uses the correlation of the object motion in multi-frame and satellite attitude motion information to identify the orbiting object 104. As will be appreciated, the crowdsource module 112 can use different object detection techniques than that described above.

In some embodiments, as part of identifying an orbiting object 104 in sensor data, the crowdsource module 112 extracts information associated with the orbiting object 104 from the sensor data, including an angular position, orbital altitude, and distance of the orbiting object 104. Illustratively, the angular position, orbital altitude, and distance of the orbiting object 104 can be determined by integrating the position and orientation of the satellite 102 that detected the orbiting object 104 with the sensor data, where the satellite's position and orientation can be obtained from the satellite's in-orbit guidance, navigation, and control (GN&C) system. The crowdsource module 112 shares the information associated with the orbiting object 104 (e.g., angular position, orbital altitude, distance, etc.) with the crowdsource satellite network 100. Illustratively, the crowdsource module 112 provides the information to the satellite's telemetry and command equipment for transmission (e.g., via radio frequency (RF)) to a terrestrial receiver for distribution to the satellites 102 (or a portion of the satellites 102) in the crowdsource satellite network 100. In some embodiments, the orbiting object information can be sent directly to another satellite 102 in the crowdsource satellite network 100 (via direct satellite-to-satellite communication).

In some embodiments, information for an orbiting object 104 provided by a satellite 102 to the crowdsource satellite network 100 is collected in a dataset 118 that is shared among the satellites 102 in the crowdsource satellite network 100 (or among a portion of the satellites 102 in the crowdsource satellite network 100). As illustrated, the dataset 118 can be stored on one or more satellites 102 in the crowdsource satellite network 100. In other embodiments, the dataset 118 can be stored at a terrestrial datacenter, which makes the dataset 118 available to the crowdsource satellite network 100. The crowdsource module 112, in some embodiments, correlates information for an individual orbiting object 104 provided by different satellites 102 by analyzing the information collected in the dataset 118 and creating a sub-dataset for the individual orbiting object 104. For example, the crowdsource module 112 analyzes the information collected in the dataset 118 to identify relationships that indicate that the information is associated with the individual orbiting object 104. As a non-limiting example, the crowdsource module 112 can correlate orbiting object information, such as angular position, orbital altitude, orbital velocity, detection timestamp, etc. captured by a first satellite 102B to the same types of information captured by a second satellite 102C, and the information can be combined into a sub-dataset for the orbiting object 104 for use in generating an orbital model 120 for the orbital object 104.

In addition to the orbiting object information, in some embodiments the satellites 102 in the crowdsource satellite network 100 share their own orbital position information with the crowdsource satellite network 100, which can be obtained from the satellites' GN&C system. The satellites' orbital positions can be included in the dataset 118 to enable the satellites' orbital paths to be used in determining an impact threat of an orbiting object 104. Also, in some embodiments, orbital position information for other spacecraft (e.g., satellites not in the crowdsource satellite network 100) can be included in the dataset 118 for use in determining an impact threat of an orbiting object 104 to a spacecraft.

The orbiting path of a satellite 102 and orbiting path of an orbiting object 104 can be detected with a crowdsource computation to determine whether their orbiting paths intersect. Namely, the crowdsource module 112 generates an orbital model 120 for an orbiting object 104 using edge/distributed computing (via the onboard computing resources of the satellites 102) and the information collected in the dataset 118. An orbital model 120 is a mathematical representation of an object environment in space used to: track the orbital motion of an orbiting object 104, predict a long-term evolution of the object environment, and calculate a probability of the orbiting object 104 colliding with a target object (e.g., a satellite 102 or another spacecraft). Various modeling techniques can be used to generate the orbital model 120. As one example, the crowdsource satellite network 100 can utilize an engineering model to predict an impact threat of an orbiting object 104 impacting a spacecraft based on a predicted path 106 of the orbiting object 104. The engineering model can track the orbital motion of the orbiting object 104 and calculate a probability of collision with a target spacecraft (short-term impact risk assessment). As another example, an evolutionary model can be utilized to predict the long-term evolution of an orbiting object environment, where an orbital decay of an orbiting object 104 and/or a collisional fragmentation of the orbiting object 104 can be predicted by the evolutionary model (long-term term risk assessment). As yet another example, a Monte Carlo simulation can be utilized to calculate short-term and long-term impact risk assessments.

After generating an orbital model 120, the crowdsource module 112 uses the orbital model 120 to simulate a trajectory of an orbiting object 104 in relation to the satellites 102 represented in the orbital model 120, and the crowdsource module 112 classifies an impact threat of the orbiting object 104 to a target satellite (e.g., satellite 102C or another spacecraft). A predicted path 106 of the orbiting object 104 is simulated using the object's orbital parameters (e.g., altitude, inclination, eccentricity) and other factors to determine whether the predicted path 106 intersects with a predicted orbital position of a target satellite. Where a predicted path 106 of the orbiting object 104 intersects with a predicted orbital position of a target satellite, an impact threat of the orbiting object 104 colliding with the target satellite is classified based on a probability that the collision will occur. Illustratively, the crowdsource module 112 can classify an impact threat as low, medium, or high.

In some embodiments, the crowdsource module 112 uses the physical characteristics of an orbiting object 104 (e.g., dimension, shape, composition, etc.) as a factor in classifying an impact threat of an orbiting object 104 to a target satellite. Various methods exist for identifying the physical characteristics of orbiting objects 104, which are within the scope of the present disclosure. Illustratively, an image(s) captured by a satellite 102 can be analyzed to measure a size, shape, and brightness of an orbiting object 104 represented in the image(s), and this information can be used to estimate a mass and albedo (reflectivity) of the orbiting object 104, which can then be used to determine a composition of the orbiting object 104. In some examples, information obtained from radar sensor(s), light detection and ranging (LiDAR) sensor(s), optical spectrometer(s) can be used to determine physical characteristics of an orbiting object 104. Thereafter, the physical characteristics can be a factor in classifying the impact threat of the orbiting object 104. As a non-limiting example, smaller objects (e.g., less than about 1 mm in size) may be categorized as having a smaller impact threat as compared to medium-sized objects (e.g., between about 1 mm and about 10 cm in size), and larger objects (e.g., greater than about 10 cm in size) may be categorized as having a higher impact threat.

Also, in some embodiments, the crowdsource module 112 uses the physical characteristics of a target satellite as a factor in classifying an impact threat of an orbiting object 104 to a target satellite. For example, a target satellite that has shielding configured to protect or mitigate damage to the target satellite from smaller objects may be a factor that decreases an impact threat of a smaller orbiting object 104, whereas a target satellite that has no shielding may be a factor that increases an impact threat of an orbiting object 104.

Predictive analytics, in some embodiments, can be used by the crowdsource module 112 to classify an impact threat of an orbiting object 104 to a target satellite based on one or more of the factors described above. The predictive analytics can be used to make predictions about future object collisions using historical object data combined with statistical modeling and machine learning. The crowdsource module 112 can generate a predictive analytics model designed to assess the historical object data, identify patterns, observe trends, predict future collision events associated with the orbiting object 104, and classify the future collision events based on an impact threat. Illustratively, types of classification models that can be used for the predictive analytics model include, but are not limited to, logistic regression, decision trees, random forest, neural networks, and Naïve Bayes. As described later in association with FIG. 3 and FIG. 4, the impact threat classification assigned to an orbiting object 104 can determine whether to initiate a proactive action that avoids a collision between the orbiting object 104 and a target satellite.

The crowdsource module 112 updates an orbital model 120 for an orbiting object 104 to account for changes to an orbiting position of the orbiting object 104 and/or a satellite(s) 102 in the crowdsource satellite network 100. The update can be performed in response to receiving new/updated information for the orbiting object 104 and/or a satellite 102 or another spacecraft. In some embodiments, each satellite 102 stores a copy of the orbital model 120 on the satellite's onboard data storage, and the orbital model 120 can be used by an individual satellite 102 to determine an impact threat of the orbiting object 104 to the individual satellite 102. Also, in some embodiments, the crowdsource satellite network 100 can send the orbital model 120 to a ground station (not shown) to allow the orbital model 120 to be used for space related operations (e.g., research, spacecraft launches, etc.).

In some embodiments, the crowdsource module 112 monitors the health of the satellites 102 included in the crowdsource satellite network 100. For example, the satellites 102 provide system status information to the crowdsource satellite network 100, and the crowdsource module 112 preforms health analyses of the satellites 102 using the system status information. In the case that a health analysis of a satellite 102 indicates that the satellite 102 is failing, the crowdsource module 112 can generate an orbital model of the failing satellite 102 to determine an impact threat associated with a predicted path of the failing satellite 102. Based on the impact threat, a proactive action that avoids a collision between the failing satellite 102 and another spacecraft can be performed, as described in association with FIG. 3 and FIG. 4 below.

The functions of the crowdsource module 112 described above can be performed by one or more of the satellites 102 to enable the crowdsource satellite network 100 to perform edge/distributed computing. In some embodiments, a satellite 102 acts as a central server that distributes tasks to other satellites 102 in the crowdsource satellite network 100. In other embodiments, the satellites 102 are configured to provide a peer-to-peer architecture wherein the satellites 102 communicate with each other via one or more ground stations and/or direct satellite-to-satellite communication. In some embodiments, various factors, such as a satellite's onboard computing capabilities, orbital altitude, etc. can be used to determine which functions of the crowdsource module 112 can be performed by the satellite 102. For example, some satellites 102 in the crowdsource satellite network 100 may be capable of performing every function of the crowdsource module 112, whereas other satellites 102 may not have sufficient computing resources to perform every function of the crowdsource module 112. As a non-limiting example, a satellite 102 equipped with sensors to detect an orbiting object 104 may not have the requisite onboard computing resources needed to generate an orbital model 120 of the orbiting object 104. Therefore, the satellite 102 can contribute information associated with orbiting objects 104 detected by the satellite 102, but does not participate in determining an impact threat of the orbiting objects 104.

The crowdsource module 112 can be implemented in software, hardware, firmware or a combination thereof. When software is used, the functions performed by the crowdsource module 112 can be implemented in program instructions configured to run on hardware, such as a processor. When firmware is used, the functions performed by crowdsource module 112 can be implemented in program instructions and data and stored in persistent memory to run on a processor. When hardware is employed, the hardware can include circuits that operate to perform the functions of the crowdsource module 112. Generally, modules (also referred to as program modules) include routines, programs, components and/or data structures that perform particular tasks and/or implement particular abstract data types. As used herein, a processor is a hardware device and is comprised of hardware circuits such as integrated circuits that respond to and process instructions and program instructions that operate a computer. When a processor executes program instructions for a process, the processor can be one or more processors that are on the same computer or on different computers. In other words, the process can be distributed between processors on the same or different satellites 102 in the crowdsource satellite network 100. All or a portion of the crowdsource module 112 can be implemented, for example by all or a subset of the computing environment 600 of FIG. 6.

While FIG. 1 illustrates an example crowdsource satellite network environment that can implement the techniques above, many other similar or different environments are possible. The example environment discussed and illustrated above is merely representative and not limiting. That is, the crowdsource satellite network 100 in FIG. 1 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 2:
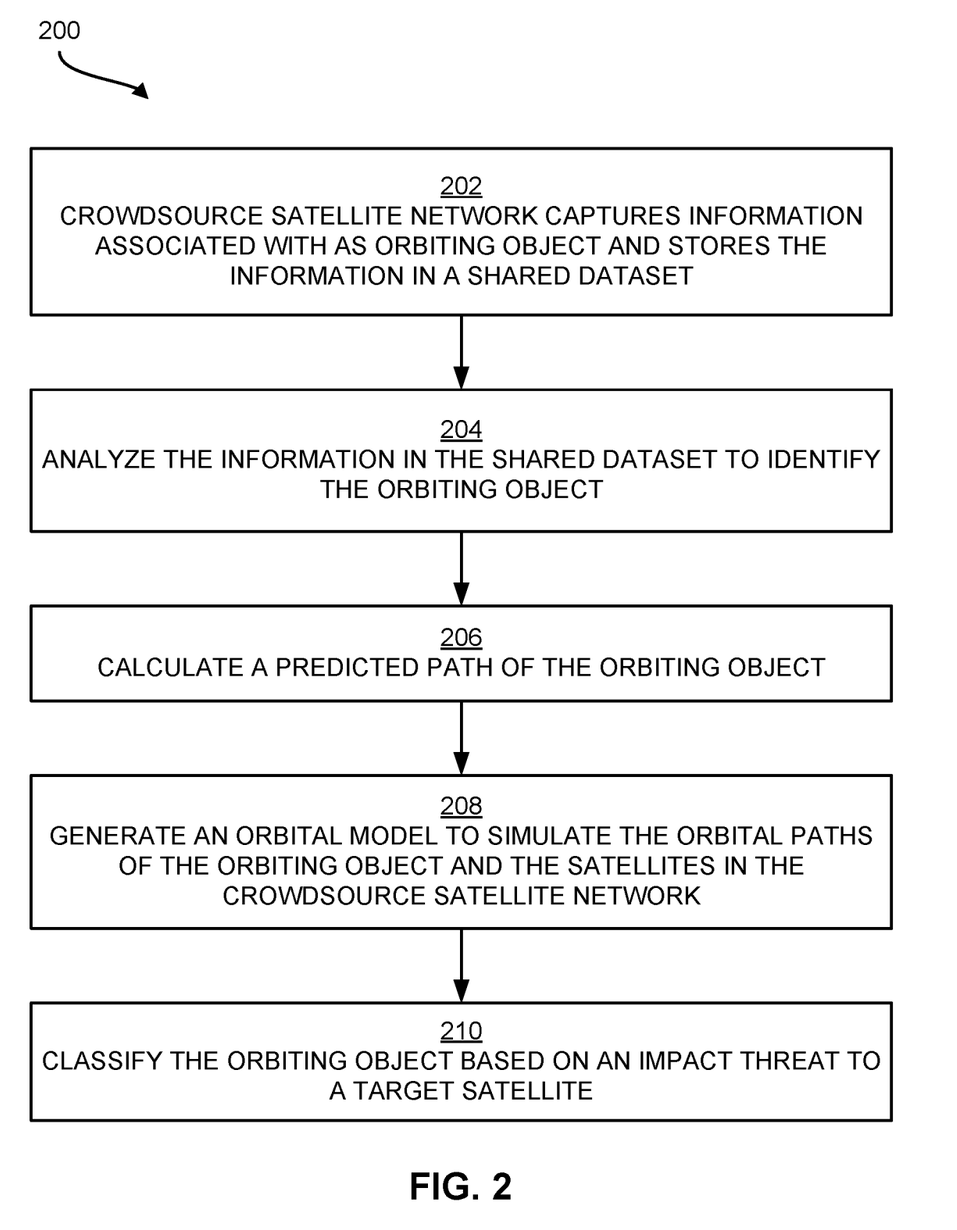
FIG. 2 is a flow diagram that illustrates an example method for classifying an impact threat of an orbiting object, in accordance with some embodiments of the present disclosure.

FIG. 2 illustrates an example method 200 for classifying an impact threat of an orbiting object, which can be implemented by the crowdsource module 112 described above in association with FIG. 1. In operation 202, the crowdsource satellite network 100 captures information associated with an orbiting object and stores the information in a shared dataset. The dataset is shared among the satellites in the crowdsource satellite network (or among a portion of satellites in the crowdsource satellite network) to enable the satellites to collaborate with each other (via edge/distributed computing) to identify and track the orbiting object.

In operation 204, the crowdsource satellite network analyzes the information in the shared dataset to identify an orbiting object. For example, the information can be analyzed to identify relationships between data (e.g., angular position, orbital altitude, orbital velocity, detection timestamp, etc.) generated by the satellites' sensors indicating an association with a single orbiting object. In some embodiments, the identification of an orbiting object can also include analysis that determines physical characteristics of the orbiting object.

In operation 206, the crowdsource satellite network calculates a predicted path for the orbiting object, which is used in operation 208 to generate an orbital model that simulates the orbital paths of both the orbiting object and the satellites in the crowdsource satellite network. In operation 210, the crowdsource satellite network classifies the orbiting object based on an impact threat of the orbiting object to a target satellite as modeled by the orbital model. In the case that an impact threat of the orbiting object is high, the crowdsource satellite network can perform a proactive action, such as change an orbital path of the target satellite to avoid the orbiting object, or provide the predicted path of the orbiting object to a debris collection satellite to allow the debris collection satellite to intercept the orbiting object, both of which are described in more detail below.

Figure 3:
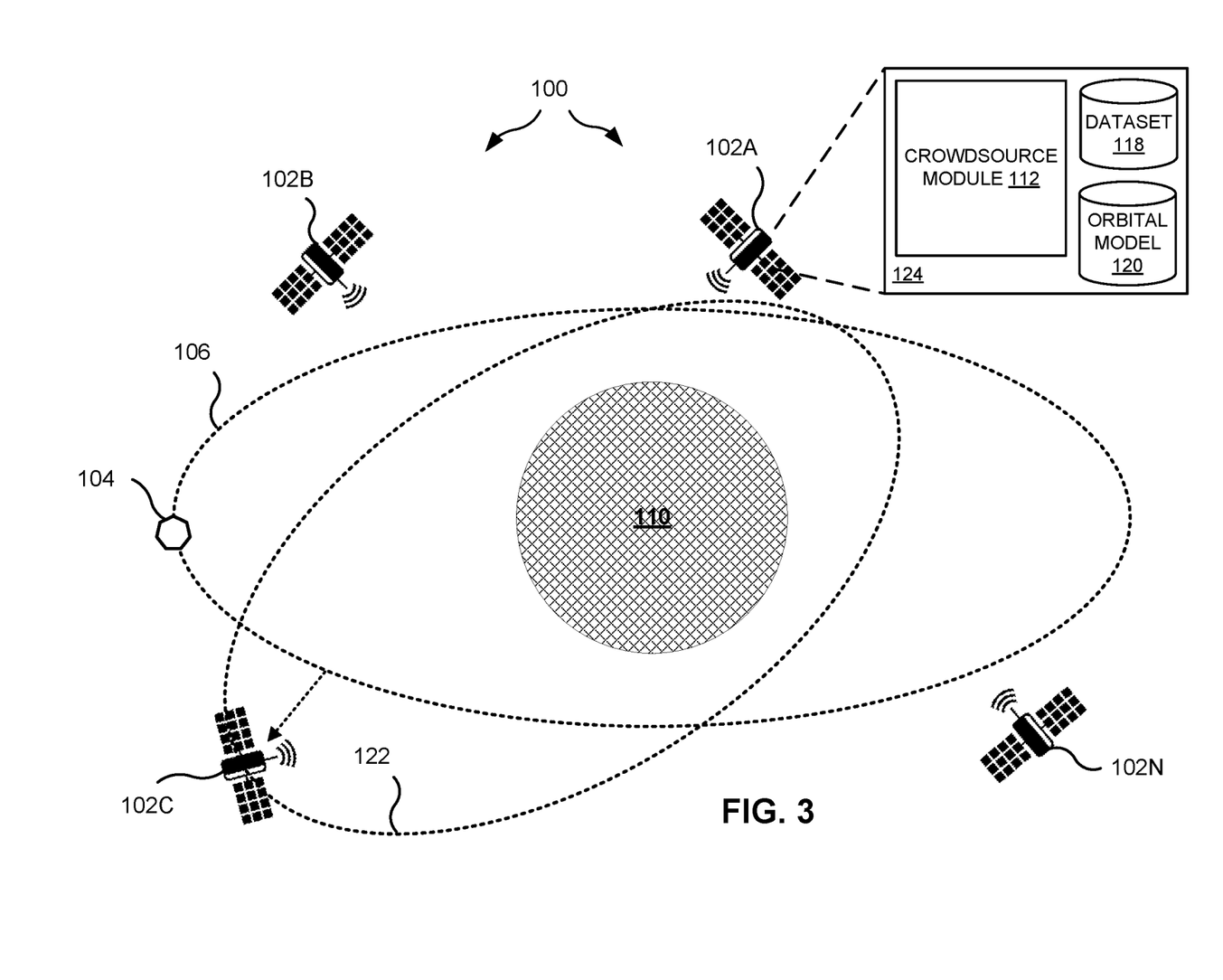
FIG. 3 is a diagram that illustrates maneuvering of a target satellite to a safe zone, in accordance with some embodiments of the present disclosure.

FIG. 3 illustrates maneuvering a target satellite 102C included in the example crowdsource satellite network 100 to a safe zone to avoid a collision with an orbiting object 104, in accordance with some embodiments of the present disclosure. As described above, the crowdsource satellite network 100 classifies an orbiting object 104 based on an impact threat of the orbiting object 104 to a target satellite 102C. The impact threat classification of the orbiting object 104 can be used to determine whether to initiate a proactive action that avoids a collision between the orbiting object 104 and the target satellite 102C. One proactive action that can be performed is changing an orbital path 122 of the target satellite 102C to a safe zone that avoids a collision with the orbiting object 104, as illustrated in FIG. 3. A safe zone is an orbital path that presents a low risk of collision to a satellite 102. The crowdsource satellite network 100 identifies a safe zone by aggregating the orbiting paths of identified orbiting objects 104 and spacecraft (e.g., satellites 102) to identify an orbiting path that has a low risk of collision with an orbiting object 104 or another spacecraft.

The crowdsource module 112 analyzes the orbital models 120 of identified orbiting objects 104, satellites 102, and other spacecraft (e.g., satellites not included in the crowdsource satellite network 100) to identify safe zones and unsafe zones for the satellites 102 at different time frames and orbital paths. A satellite 102 can include a propulsion system (e.g., electrodynamic propulsion, propellant tanks, etc.) that enables the satellite 102 to maneuver while in orbit. In the case that an impact threat classification of an orbiting object 104 indicates that there is a high probability that the orbiting object 104 will collide with a target satellite 102C, the crowdsource satellite network 100 can identify a safe zone, and the target satellite 102C can be instructed to change its orbital path 122 to move to the safe zone. In response, the target satellite 102C initiates a maneuver (indicated by the dotted arrow in FIG. 3) to move to the safe zone.

Although FIG. 3 illustrates maneuvering a target satellite 102C included in the example crowdsource satellite network 100 to a safe zone to avoid a collision with an orbiting object 104, other spacecraft not included in the crowdsource satellite network 100 are within the scope of the present disclosure, such that the crowdsource satellite network 100 can provide notice to a spacecraft operator to allow an orbital path of the spacecraft to be changed to avoid a collision with an orbiting object 104 identified by the crowdsource satellite network 100.

Figure 4:
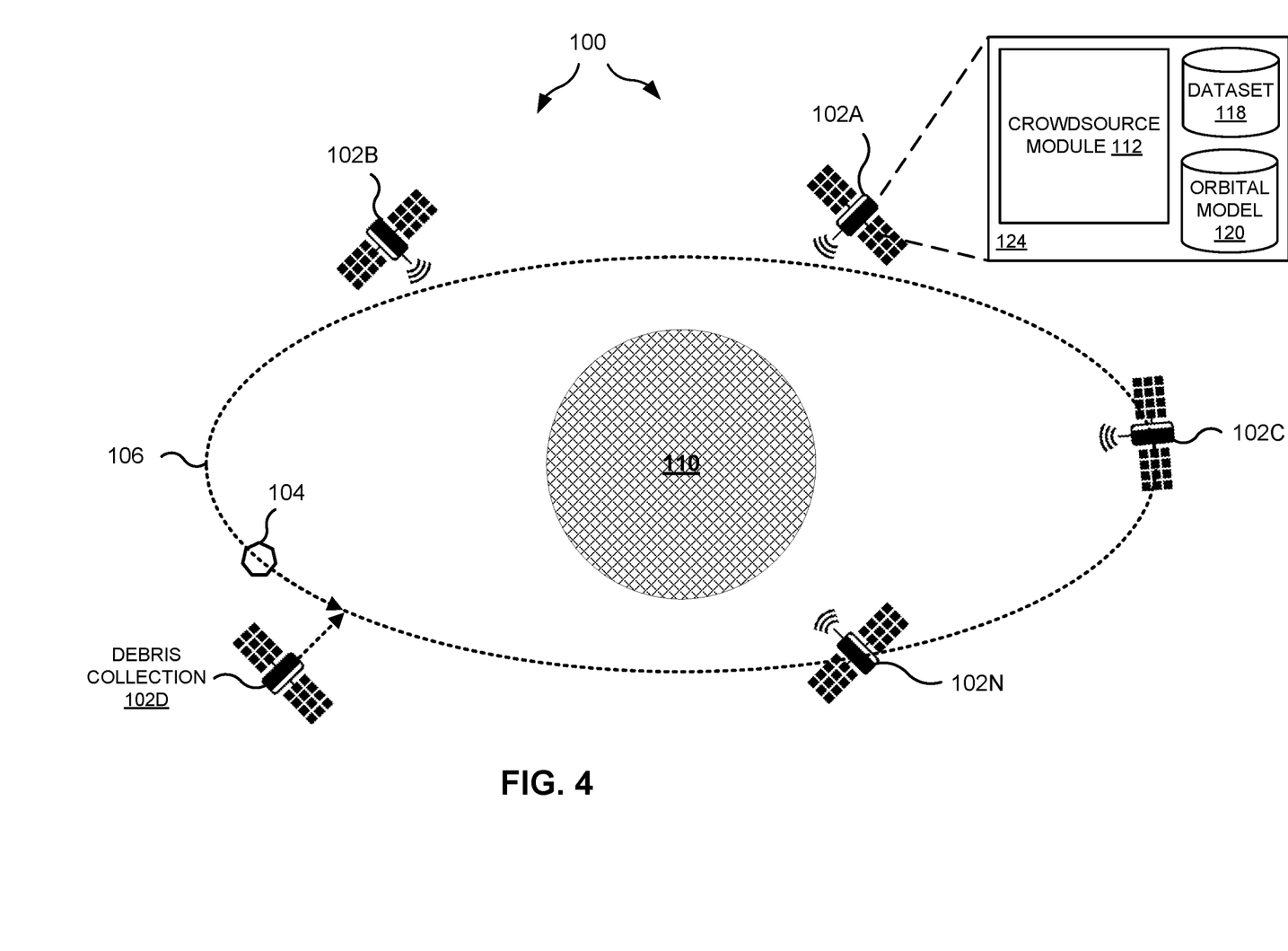
FIG. 4 is a diagram that illustrates removing an orbiting object to avoid a collision, in accordance with some embodiments of the present disclosure.

FIG. 4 illustrates removing an orbiting object 104 to avoid a collision with one or more target satellites included in the example crowdsource satellite network 100, in accordance with some embodiments of the present disclosure. As part of classifying an orbiting object 104, the crowdsource satellite network 100 identifies an impact severity of an orbiting object 104 on a zone to determine whether to perform a proactive action that removes the orbiting object 104 from the zone (e.g., by capturing the orbiting object 104 or changing an orbital path of the orbiting object 104). The impact severity to a zone may be high when a collision between an orbiting object 104 and a satellite 102 could result in collisional cascading, or an ablation cascade, where the orbiting object 104 in low Earth orbit causes a cascade in which each collision generates space debris that increases the likelihood of further collisions.

The crowdsource satellite network 100 determines an impact severity to a zone (orbital path), and in the case that the impact severity to the zone is high, the crowdsource satellite network 100 maneuvers a debris collector satellite 102D to a target location to remove an orbiting object 104 from the zone. For example, the crowdsource module 112 analyzes the orbital models 120 of identified orbiting objects 104, satellites 102, and other spacecraft to determine an impact severity to a zone, and provides a predicted path 106 of an orbiting object 104 to a debris collection satellite 102D to allow the debris collection satellite 102D to intercept the orbiting object 104. Illustratively, the debris collection satellite 102D can include one or more impact (or debris collection) pads or other debris removal means. An impact pad can be configured to remove or collect various sizes and types of orbiting objects 104, and those of ordinary skill in the art will be familiar with many suitable forms for impact pads (e.g., Whipple shield or bumper).

In the illustrative examples above, the same reference numerals may be used in more than one figure. This reuse of reference numerals in different figures represents the same element in the different figures.

Figure 5:
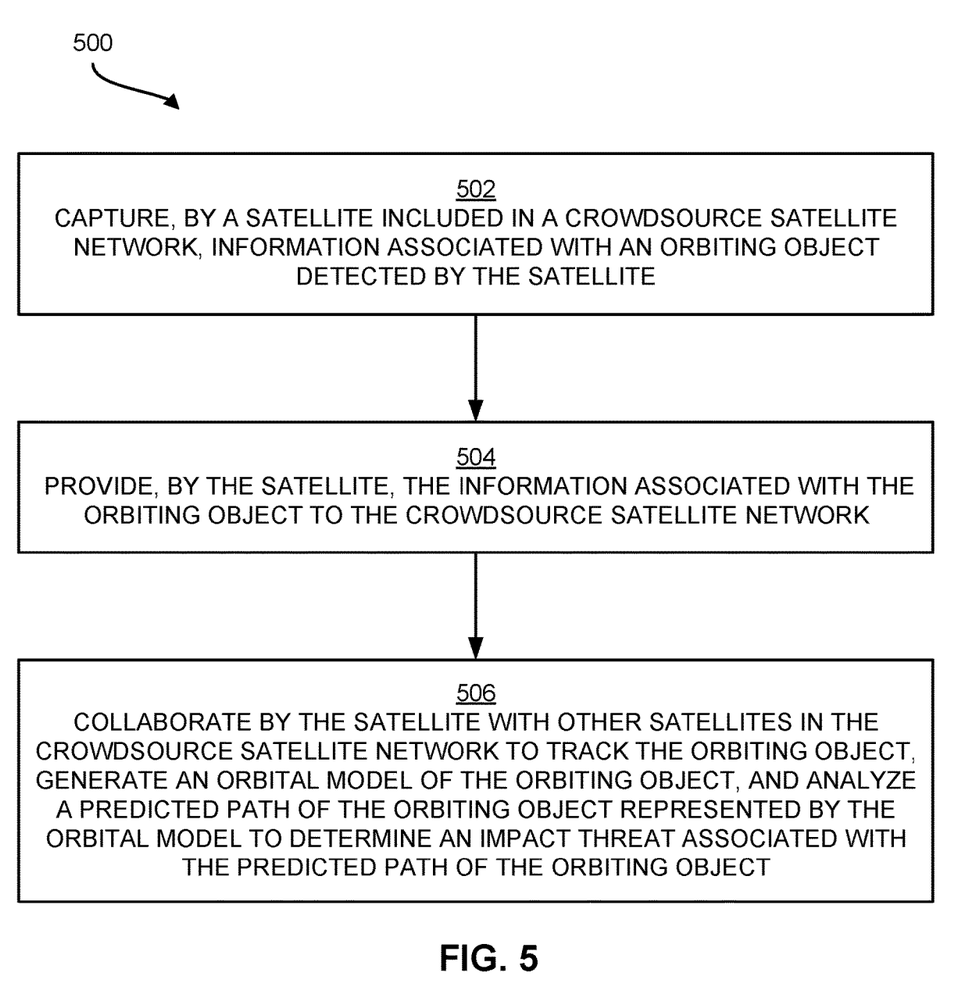
FIG. 5 is a flow diagram illustrating an example method for determining an impact threat of an orbiting object by a crowdsource satellite network, in accordance with some embodiments of the present disclosure.

FIG. 5 is a flow diagram illustrating an example method 500 for determining an impact threat of an orbiting object by a crowdsource satellite network, in accordance with some embodiments of the present disclosure. In operation 502, a satellite included in the crowdsource satellite network captures information associated with an orbiting object detected by the satellite.

In operation 504, the satellite provides the information associated with the orbiting object to the crowdsource satellite network. In some embodiments of the method 500, the satellite also provides an orbital position of the satellite to the crowdsource satellite network to allow the crowdsource satellite network to generate an orbital model of the satellite. The orbital model of the satellite can be aggregated with other orbital models of satellites in the crowdsource network to create a crowdsource satellite network model. In some embodiments, orbital models of spacecraft not included in the crowdsource satellite network can be combined with the crowdsource satellite network model to create a more comprehensive orbital model of an environment where the crowdsource satellite network operates.

In operation 506, the satellite collaborates with other satellites in the crowdsource satellite network to track the orbiting object, generate an orbital model of the orbiting object, and analyze a predicted path of the orbiting object represented by the orbital model to determine an impact threat associated with the predicted path of the orbiting object. In some embodiments of the method 500, the orbital model is sent to a ground station to allow the orbital model to be used for space related operations, such as research, spacecraft launches, etc.

In some embodiments of the method 500, the satellite collaborates with the other satellites in the crowdsource satellite network to determine a position and direction of the orbiting object based on one or more orbital positions of one or more satellites that detected the orbiting object. That is, the orbital coordinates of the satellite(s) that detected the orbiting object are used to determine the position and direction of the orbiting object.

In some embodiments of the method 500, the satellite collaborates with the other satellites in the crowdsource satellite network, and in response to determination that the impact threat associated with the predicted path of the orbiting object to a target satellite is high, and the crowdsource satellite network proactively changes an orbital path of the target satellite to avoid the orbiting object. Alternatively, in some embodiments of the method 500, the satellite collaborates with the other satellites in the crowdsource satellite network, and in response to a determination that a severity of the impact threat associated with the predicted path of the orbiting object is high, and the crowdsource satellite network provides the predicted path of the orbiting object to a debris collection satellite to allow the debris collection satellite to intercept the orbiting object. Also, in some embodiments of the method 500, the crowdsource satellite network monitors the health of the satellites, and in response to a health analysis of a satellite that indicates that a satellite is failing, the crowdsource satellite network generates an orbital model of the satellite to identify an impact threat associated with a predicted path of the failing satellite, thereby allowing a proactive action to be performed based on the impact threat of the failing satellite to other spacecraft.

In alternative implementations of the illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 6:
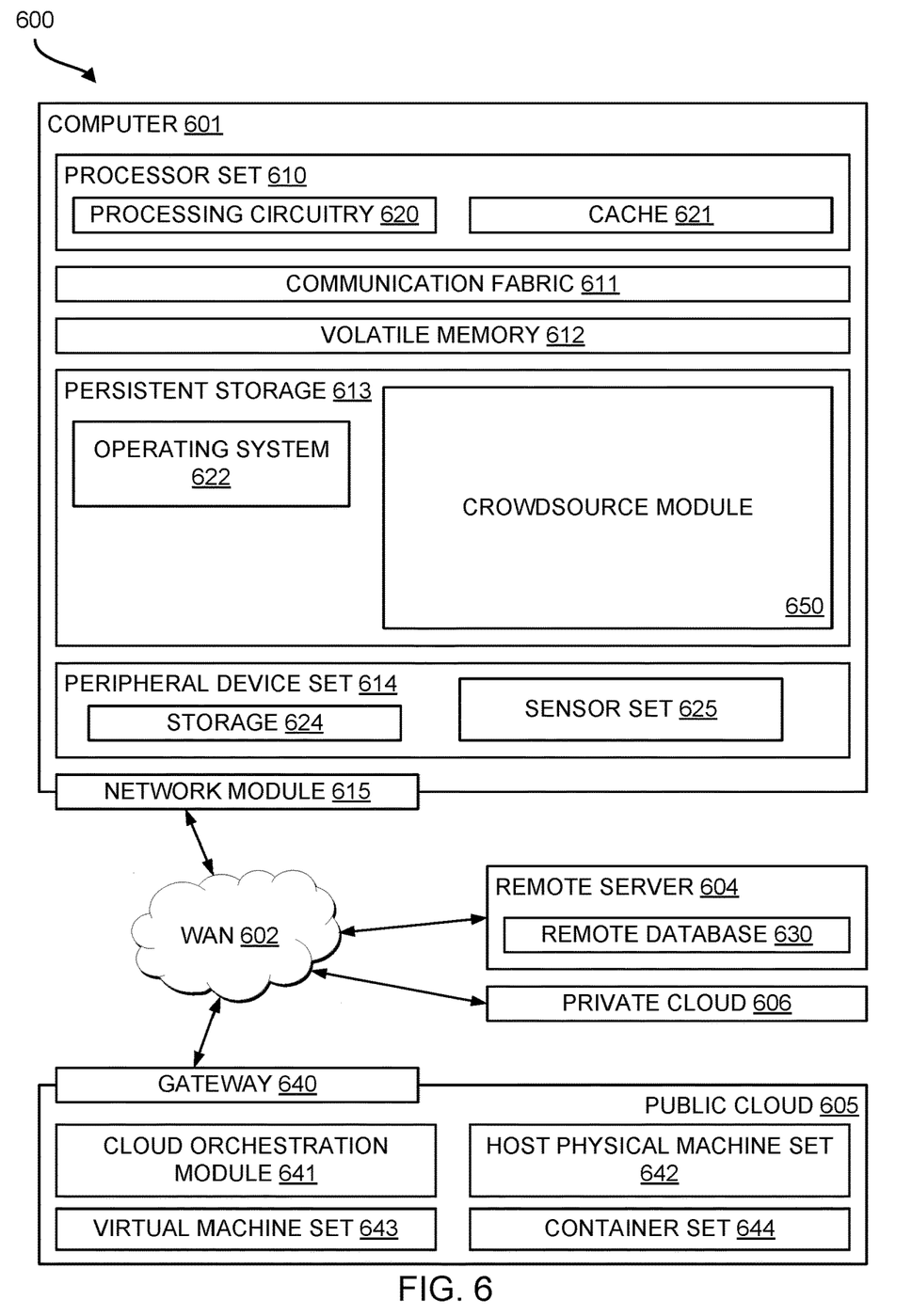
FIG. 6 is a block diagram that illustrates an example computing environment in which aspects of the present disclosure can be implemented, in accordance with some embodiments of the present disclosure.

Computing environment 600 contains an example of an environment for the execution of at least some of the computer code involved in performing the disclosed methods, such as block 650 containing code for the crowdsource module 112 described earlier. In addition to block 650, computing environment 600 can include, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 650, as identified above), peripheral device set 614 (including storage 624, and sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of any computing device now known or to be developed in the future that is capable of running a program, accessing a network, or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 621 and the other storage media discussed below. The computer readable program instructions, and associated data, are accessed by processor set 610 to control and direct performance of the disclosed methods. In computing environment 600, at least some of the instructions for performing the disclosed methods may be stored in block 650 in persistent storage 613.

COMMUNICATION FABRIC 611 is the signal conduction paths that allow the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, the volatile memory is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid-state storage devices. Operating system 622 may take several forms, such as various known proprietary operating systems or open-source Portable Operating System Interface type operating systems that employ a kernel. The code included in block 650 typically includes at least some of the computer code involved in performing the disclosed methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the Internet. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. Sensor set 625 is made up of sensors that can be used in detecting objects. For example, one sensor may be a camera, another sensor may be a radar sensor, a LiDAR sensor, or an optical spectrometer.

NETWORK MODULE 615 is the collection of computer software, hardware, and firmware that allows computer 601 to communicate with other computers through WAN 602. Network module 615 may include hardware, such as signal transceivers, and software for packetizing and/or de-packetizing data for communication network transmission. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices.

WAN 602 is any wide area network capable of communicating computer data over non-local distances by any technology for communicating computer data, now known or to be developed in the future. The WAN typically includes computer hardware such as ground station equipment, copper transmission cables, optical transmission fibers, wireless transmission, routers, firewalls, switches, gateway computers, and edge servers.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide historical data for orbiting objects, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. The terms "comprises," "comprising," "includes," "including," "has," "having," "contains" or "containing," or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof.

In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Any data and data structures illustrated or described herein are examples only. In addition, any data can be combined with logic, so that a separate data structure may not be necessary.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure. Note further that numerous aspects or features are disclosed herein, and unless inconsistent, each disclosed aspect or feature is combinable with any other disclosed aspect or feature as desired for a particular application of the concepts disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Furthermore, as used herein, the terms "example" and/or "illustratively" are utilized to mean serving as an example, instance, or illustration. For the avoidance of doubt, the subject matter described herein is not limited by such examples. In addition, any aspect or design described herein as an "example" and/or an "illustration" is not necessarily to be construed as preferred or advantageous over other aspects or designs, nor is it meant to preclude equivalent exemplary structures and techniques known to those of ordinary skill in the art. Any advantages discussed in the present disclosure are example advantages, and embodiments of the present disclosure can exist that realize all, some, or none of any of the discussed advantages while remaining within the spirit and scope of the present disclosure.

What is claimed is:

1. A computer-implemented method comprising:
    capturing, by a satellite included in a crowdsource satellite network, information associated with an orbiting object detected by the satellite, wherein the crowdsource satellite network comprises a plurality of satellites with onboard computing configured for distributed computing;
    providing, by the satellite, the information associated with the orbiting object to the crowdsource satellite network for use in generating an orbital model of the orbiting object using the distributed computing of the crowdsource satellite network; and
    communicating by the satellite with one or more other satellites in the crowdsource satellite network to generate the orbital model of the orbiting object using the distributed computing of the crowdsource satellite network,
    wherein a predicted path of the orbiting object represented by the orbital model is analyzed to determine an impact threat associated with the predicted path of the orbiting object.

2. The computer-implemented method of claim 1, further comprising providing, by the satellite, an orbital position of the satellite to the crowdsource satellite network to allow the crowdsource satellite network to generate an orbital model of the satellite for aggregation with other orbital models for the one or more other satellites in the crowdsource satellite network to create a crowdsource satellite network model.

3. The computer-implemented method of claim 1, wherein communicating by the satellite with the one or more other satellites in the crowdsource satellite network further comprises:
    generating the orbital model based on one or more orbital positions of one or more satellites that detected the orbiting object.

4. The computer-implemented method of claim 1, further comprising:
    determining that the impact threat associated with the predicted path of the orbiting object to a target satellite is high; and
    proactively changing an orbital path of the target satellite to avoid the orbiting object.

5. The computer-implemented method of claim 1, further comprising:
    determining that a severity of the impact threat associated with the predicted path of the orbiting object is high; and
    providing the predicted path of the orbiting object to a debris collection satellite to allow the debris collection satellite to intercept the orbiting object.

6. The computer-implemented method of claim 1, wherein the orbiting object is a failing satellite, and communicating by the satellite with the one or more other satellites in the crowdsource satellite network further comprises:
    generating the orbital model for the failing satellite to determine an impact threat associated with a predicted path of the failing satellite.

7. The computer-implemented method of claim 1, further comprising sending the orbital model to a ground station to allow the orbital model to be used for space related operations.

8. A system comprising:
one or more sensors operatively coupled to a satellite;
one or more computer readable storage media storing program instructions and one or more processors which, in response to executing the program instructions, are configured to:
extract, by the satellite, information associated with an orbiting object from sensor data generated by the one or more sensors, wherein the satellite is included in a crowdsource satellite network comprising a plurality of satellites with onboard computing configured to for distributed computing;
provide, by the satellite, the information associated with the orbiting object to the crowdsource satellite network for use in generating an orbital model of the orbiting object using the distributed computing of the crowdsource satellite network; and
communicate by the satellite with one or more other satellites in the crowdsource satellite network to generate the orbital model of the orbiting object using the distributed computing of the crowdsource satellite network,
wherein a predicted path of the orbiting object represented by the orbital model is analyzed to determine an impact threat associated with the predicted path of the orbiting object.

9. The system of claim 8, wherein the program instructions are further configured to cause the one or more processors to:
provide, by the satellite, an orbital position of the satellite to the crowdsource satellite network to allow the crowdsource satellite network to generate an orbital model of the satellite for aggregation with other orbital models for the one or more other satellites in the crowdsource satellite network to create a crowdsource satellite network model.

10. The system of claim 8, wherein the program instructions configured to cause the one or more processors to communicate by the satellite with the one or more other satellites in the crowdsource satellite network are further configured to cause the one or more processors to:
generate the orbital model based on one or more orbital positions of one or more satellites that detected the orbiting object.

11. The system of claim 8, wherein the program instructions are further configured to cause the one or more processors to:
determine that the impact threat associated with the predicted path of the orbiting object to a target satellite is high; and
proactively change an orbital path of the target satellite to avoid the orbiting object.

12. The system of claim 8, wherein the program instructions are further configured to cause the one or more processors to:
determine that a severity of the impact threat associated with the predicted path of the orbiting object is high; and
provide the predicted path of the orbiting object to a debris collection satellite to allow the debris collection satellite to intercept the orbiting object.

13. The system of claim 8, wherein the orbiting object is a failing satellite, and the program instructions configured to cause the one or more processors to communicate by the satellite with the one or more other satellites in the crowdsource satellite network are further configured to cause the one or more processors to:
generate the orbital model for the failing satellite to determine an impact threat associated with a predicted path of the failing satellite.

14. The system of claim 8, wherein the program instructions are further configured to cause the one or more processors to:
send the orbital model to a ground station to allow the orbital model to be used for space related operations.

15. A computer program product comprising:
one or more computer readable storage media, and program instructions collectively stored on the one or more computer readable storage media, the program instructions configured to cause one or more processors to:
capture, by a satellite included in a crowdsource satellite network, information associated with an orbiting object detected by the satellite, wherein the crowdsource satellite network comprises a plurality of satellites with onboard computing configured for distributed computing;
provide, by the satellite, the information associated with the orbiting object to the crowdsource satellite network for use in generating an orbital model of the orbiting object using the distributed computing of the crowdsource satellite network; and
communicate by the satellite with one or more other satellites in the crowdsource satellite network to generate the orbital model of the orbiting object using the distributed computing of the crowdsource satellite network,
wherein a predicted path of the orbiting object represented by the orbital model is analyzed to determine an impact threat associated with the predicted path of the orbiting object.

16. The computer program product of claim 15, wherein the program instructions are further configured to cause the one or more processors to:
provide, by the satellite, an orbital position of the satellite to the crowdsource satellite network to allow the crowdsource satellite network to generate an orbital model of the satellite for aggregation with other orbital models for the one or more other satellites in the crowdsource satellite network to create a crowdsource satellite network model.

17. The computer program product of claim 15, wherein the program instructions configured to cause the one or more processors to communicate by the satellite with the one or more other satellites in the crowdsource satellite network are further configured to cause the one or more processors to:
generate the orbital model based on one or more orbital positions of one or more satellites that detected the orbiting object.

18. The computer program product of claim 15, wherein the program instructions are further configured to cause the one or more processors to:
determine that the impact threat associated with the predicted path of the orbiting object to a target satellite is high; and
proactively change an orbital path of the target satellite to avoid the orbiting object.

19. The computer program product of claim 15, wherein the program instructions are further configured to cause the one or more processors to:

determine that a severity of the impact threat associated with the predicted path of the orbiting object is high; and provide the predicted path of the orbiting object to a debris collection satellite to allow the debris collection satellite to intercept the orbiting object.

20. The computer program product of claim 15, wherein the orbiting object is a failing satellite, and the program instructions configured to cause the one or more processors to communicate by the satellite with the one or more other satellites in the crowdsource satellite network are further configured to cause the one or more processors to:

generate the orbital model for the failing satellite to determine an impact threat associated with a predicted path of the failing satellite.

* * * * *